(12) United States Patent
Veliz et al.

(10) Patent No.: US 10,760,455 B2
(45) Date of Patent: Sep. 1, 2020

(54) POPPET VALVE FOR AN INTERNAL COMBUSTION ENGINE

(71) Applicant: Caterpillar Inc., Peoria, IL (US)

(72) Inventors: Mark D. Veliz, Metamora, IL (US);
Rong Qu, Dunlap, IL (US); Arun Lal Gain, Champaign, IL (US); Walter Sherman Isenberg, Frankfort, IN (US);
Rui Yuan, Champaign, IL (US);
Thierry Andre Marchione, Heber City, UT (US)

(73) Assignee: Caterpillar Inc., Peoria, IL (US)

( * ) Notice: Subject to any disclaimer, the term of this patent is extended or adjusted under 35 U.S.C. 154(b) by 62 days.

(21) Appl. No.: 15/384,523

(22) Filed: Dec. 20, 2016

(65) Prior Publication Data
US 2018/0171837 A1 Jun. 21, 2018

(51) Int. Cl.
*F01L 3/14* (2006.01)
*F01L 3/06* (2006.01)
*F01L 1/32* (2006.01)

(52) U.S. Cl.
CPC ....... *F01L 3/14* (2013.01); *F01L 3/06* (2013.01); *F01L 1/32* (2013.01); *Y02T 10/146* (2013.01)

(58) Field of Classification Search
CPC ............... F01L 3/14; F01L 3/16; F01L 3/20
USPC ...................................................... 123/188.3
See application file for complete search history.

(56) References Cited

U.S. PATENT DOCUMENTS

| | | | |
|---|---|---|---|
| 2,882,886 A | 4/1959 | Butcher, Jr. | |
| 4,169,488 A * | 10/1979 | Goloff | F01L 3/18 123/188.3 |
| 5,005,538 A * | 4/1991 | Bergeron | F01L 1/28 123/188.3 |
| 5,168,843 A * | 12/1992 | Franks | F01L 3/085 123/188.2 |
| 5,673,656 A | 10/1997 | Knob | |
| 6,453,867 B1 | 9/2002 | Ruhland et al. | |
| 6,546,902 B1 * | 4/2003 | Davis | F01L 1/285 123/79 C |

(Continued)

FOREIGN PATENT DOCUMENTS

| | | |
|---|---|---|
| CH | 641244 | 2/1984 |
| DE | 2923720 | 12/1980 |

(Continued)

*Primary Examiner* — Lindsay M Low
*Assistant Examiner* — Omar Morales
(74) *Attorney, Agent, or Firm* — Oblon, McClelland, Maier & Neustadt

(57) ABSTRACT

A poppet valve has an elongated stem that is configured to extend along a longitudinal axis. The poppet valve further includes a valve body that is disposed laterally with respect to the longitudinal axis and located in a spaced apart relation with an end of the elongated stem. The valve body has a pair of opposing faces disposed co-axial with the longitudinal axis of the elongated stem. The poppet valve also includes at least two arcuately shaped appendages depending downwardly from the end of the elongated stem and extending away from the longitudinal axis of the elongated stem. An end of each appendage is disposed in abutment with an annular region defined on one of the opposing faces of the valve body, a perimeter of the annular region being larger than a perimeter of the elongated stem measured about the longitudinal axis.

20 Claims, 10 Drawing Sheets

(56) References Cited

U.S. PATENT DOCUMENTS 8,893,680 B2 * 11/2014 Yagi .................. B23P 15/002
                                                  123/188.3
2007/0240696 A1 * 10/2007 Jackson ................ F01L 1/28
                                                   123/79 C

FOREIGN PATENT DOCUMENTS

| GB | 1217265    | 12/1970 |
| JP | 61229908   | 10/1986 |
| JP | 2009030526 | 2/2009  |

* cited by examiner

POPPET VALVE FOR AN INTERNAL COMBUSTION ENGINE

TECHNICAL FIELD

The present disclosure relates to a valve. More particularly, the present disclosure relates to a poppet valve that is configured for use with a cylinder head of an internal combustion engine.

BACKGROUND

It is well known in the art to provide one or more valves to a combustion chamber of an engine for operatively administering a charge of air or fuel-air mixture into the combustion chamber and also for facilitating one or more products of combustion to exit the combustion chamber. An example of such a valve includes a poppet valve that is disposed, at least in part, within a valve guide portion of a cylinder head associated with the engine. Such poppet valves typically consist of an elongated stem that extends into a valve body by means of a tapered portion.

German Patent DE 29 23 720 discloses a valve having a valve stem. The valve stem is configured to carry a head closure disc via two or more bracket-shaped curved portions. These curved portions bridge a laterally open hollow space between a lower end of the stem and the disc. The curved portions may curve downwards away from the stem and extend further down towards the disc in axial direction. The disc may have a conical contour extending upward into the space. The disc, the stem and the curved portions may be formed as an integral component.

However, an ever increasing demand in the performance and power density of engines has been compelling manufacturers of engines to re-conceptualize the design of engine components, particularly, in the design and performance of valves incorporated for use in the engines. Accordingly, manufacturers of engine components have been undertaking efforts in developing various engine components including, but not limited to, valves so that the developed engine components are rendered with improved structural and performance characteristics for improving the overall performance and power density of the engines.

SUMMARY OF THE DISCLOSURE

In an aspect of the present disclosure, a poppet valve has an elongated stem that is configured to extend along a longitudinal axis. The poppet valve also includes a valve body that is disposed laterally with respect to the longitudinal axis and located in a spaced apart relation with an end of the elongated stem. The valve body has a pair of opposing faces disposed co-axial with the longitudinal axis of the elongated stem. The poppet valve further includes at least two arcuately shaped appendages depending downwardly from the end of the elongated stem and extending away from the longitudinal axis of the elongated stem. An end of each appendage is disposed in abutment with an annular region defined on one of the opposing faces of the valve body. A perimeter of the annular region to which the end of each appendage abuts is larger than a perimeter of the elongated stem measured about the longitudinal axis. Additionally or optionally, each of at least two arcuately shaped appendages has a mid-portion. The mid-portion of each arcuately shaped appendages is concavely bent so as to be disposed proximal to the longitudinal axis.

In another aspect of the present disclosure, a poppet valve has an elongated stem that is configured to extend along a longitudinal axis. The poppet valve also includes a valve body that is disposed laterally with respect to the longitudinal axis and located in a spaced apart relation with an end of the elongated stem. The valve body has a pair of opposing faces disposed co-axial with the longitudinal axis of the elongated stem. The poppet valve further includes at least two arcuately shaped primary appendages depending downwardly from the end of the elongated stem and extending away from the longitudinal axis of the elongated stem. An end of each primary appendage is configured to branch off into a plurality of secondary appendages such that an end of each secondary appendage is disposed in abutment with an annular region defined on one of the opposing faces of the valve body. A perimeter of the annular region to which the end of each secondary appendage abuts is larger than a perimeter of the elongated stem measured about the longitudinal axis. Additionally or optionally, each of primary and secondary appendages is concavely bent so as to be disposed proximal to the longitudinal axis.

In yet another aspect of the present disclosure, embodiments disclosed herein have also been directed to a poppet valve having at least two arcuately shaped primary appendages depending downwardly from an end of the elongated stem and extending away from a longitudinal axis of the elongated stem. An end of at least one primary appendage is disposed in abutment with an annular region defined on one of the opposing faces of the valve body, and an end of at least another one of the primary appendages is configured to branch off into a plurality of secondary appendages such that an end of each secondary appendage is disposed in abutment with an annular region defined on one of the opposing faces of the valve body. A perimeter of the annular region to which respective ends of the primary and secondary appendages abut with is larger than a perimeter of the elongated stem measured about the longitudinal axis.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
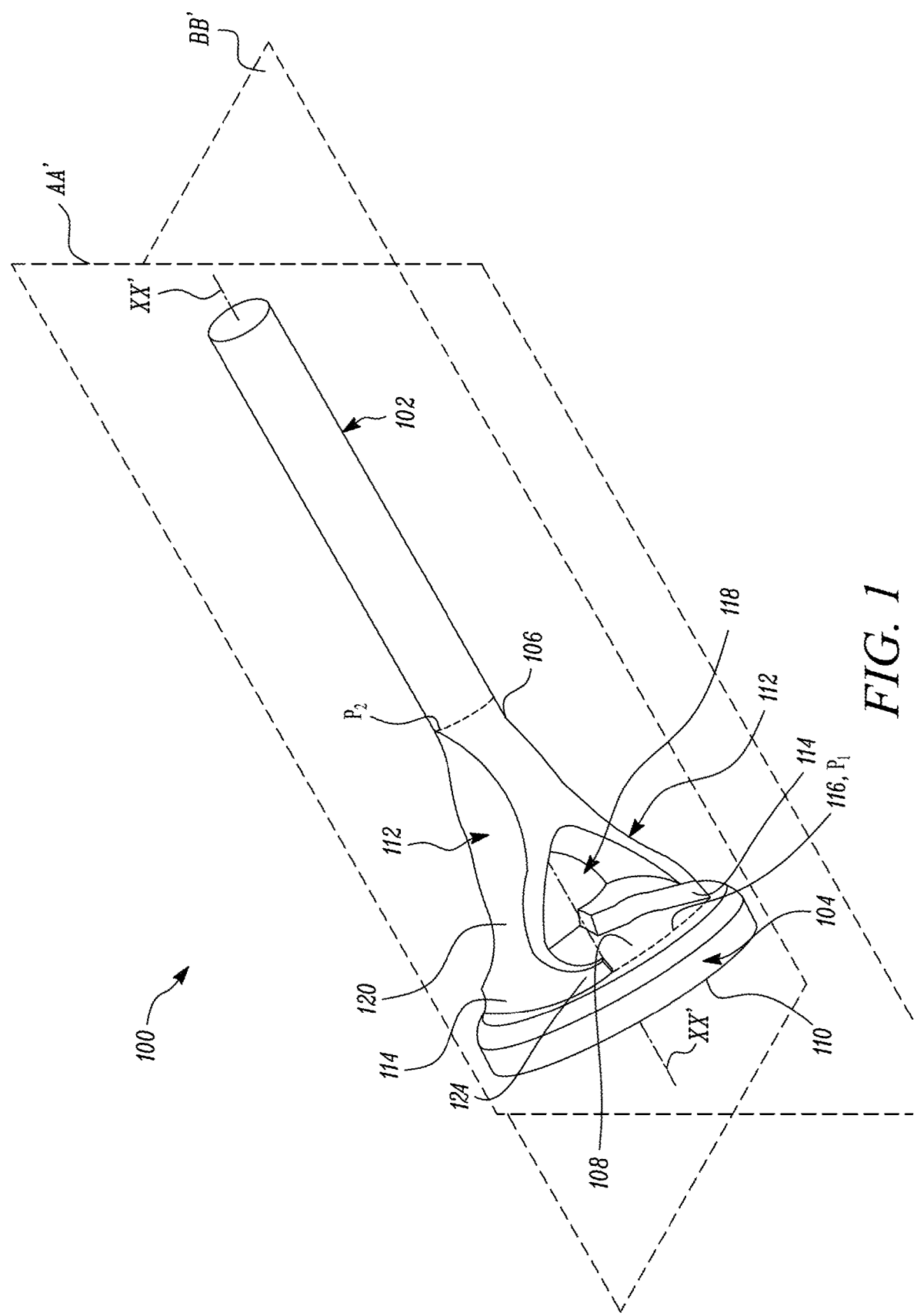
FIG. 1 is a perspective view of a poppet valve, in accordance with an embodiment of the present disclosure.

FIG. 1 illustrates a poppet valve 100, in accordance with an embodiment of the present disclosure. The poppet valve 100 may be used as an intake valve or an exhaust valve in conjunction with a cylinder head (not shown) of an internal combustion engine (shown). When used as an intake valve, the poppet valve 100 disclosed herein can operatively facilitate a charge of air or air-fuel mixture to enter a combustion chamber (not shown) of the engine. Alternatively, when used as an exhaust valve, the poppet valve 100 disclosed herein can operatively facilitate one or more products of combustion to exit the combustion chamber of the engine.

With continued reference to FIG. 1, the poppet valve 100 has an elongated stem 102 that is configured to extend along a longitudinal axis XX'. Moreover, as shown, the elongated stem 102 is cylindrical in shape. The cylindrical shape of the elongated stem 102 is configured to help the elongated stem 102 to be slidably disposed within a correspondingly cylindrical valve guide portion (not shown) of the cylinder head. It is hereby envisioned that during operation of the poppet valve 100, the elongated stem 102 may be required to reciprocate within the cylindrical valve guide portion associated with the cylinder head of the engine.

Although a shape of the valve guide portion is disclosed as being cylindrical, reference made to the cylindrical valve guide portion herein is non-limiting of this disclosure. It will be acknowledged by persons skilled in the art that the valve guide portion may, additionally or optionally, be implemented in conjunction with other structural characteristics. For example, a helical guide (not shown) may be additionally defined along a length of the valve guide portion for facilitating a delivery of lubricant and therefore, accomplishing a lubrication of the poppet valve 100 and/or other components of a valvetrain assembly in operation. It is to be noted that such structural characteristics may, however, be implemented in the valve guide portion of the cylinder head depending on specific requirements of an application, and therefore, may vary from one application to another.

The poppet valve 100 also includes a valve body 104 that is disposed laterally with respect to the longitudinal axis XX' and located in a spaced apart relation with an end 106 of the elongated stem 102. The valve body 104 has a pair of opposing faces 108, 110 disposed co-axial with the longitudinal axis XX' of the elongated stem 102. For the sake of convenience and simplicity, the opposing face '108' will hereinafter be referred to as 'top face' and designated with identical numeral '108'. Similarly, the opposing face '110' will hereinafter be referred to as 'the seating surface' and denoted with identical numeral '110'.

The poppet valve 100 further includes at least two arcuately shaped appendages 112. In the illustrated embodiment of FIG. 1, two arcuately shaped appendages 112 have been shown depending downwardly from the end 106 of the elongated stem 102 and extending away from the longitudinal axis XX' of the elongated stem 102. Although two appendages 112 have been shown in the illustrated embodiment of FIG. 1, it may be noted that, in other embodiments, any number of appendages including, but not limited to, three, four, five, or six appendages may be implemented in the poppet valve 100 in lieu of the two appendages 112 disclosed herein. A number of appendages implemented in the design of the poppet valve 100 disclosed herein may vary from one application to another depending on specific requirements of an application.

An end 114 of each appendage 112 is disposed in abutment with an annular region 116 defined on one of the opposing faces i.e., the top face 108 of the valve body 104. A step portion 124 is disposed in the end 114. Moreover, as shown in FIG. 1, a perimeter $P_1$ of the annular region 116 to which the end 114 of each appendage 112 abuts is larger than a perimeter $P_2$ of the elongated stem 102 measured about the longitudinal axis XX'. The poppet valve 100 also includes a void 118 defined between each of the at least two arcuately shaped appendages 112 and the valve body 104. The void 118 disclosed herein is configured to include the longitudinal axis XX' therein.

Figure 2:
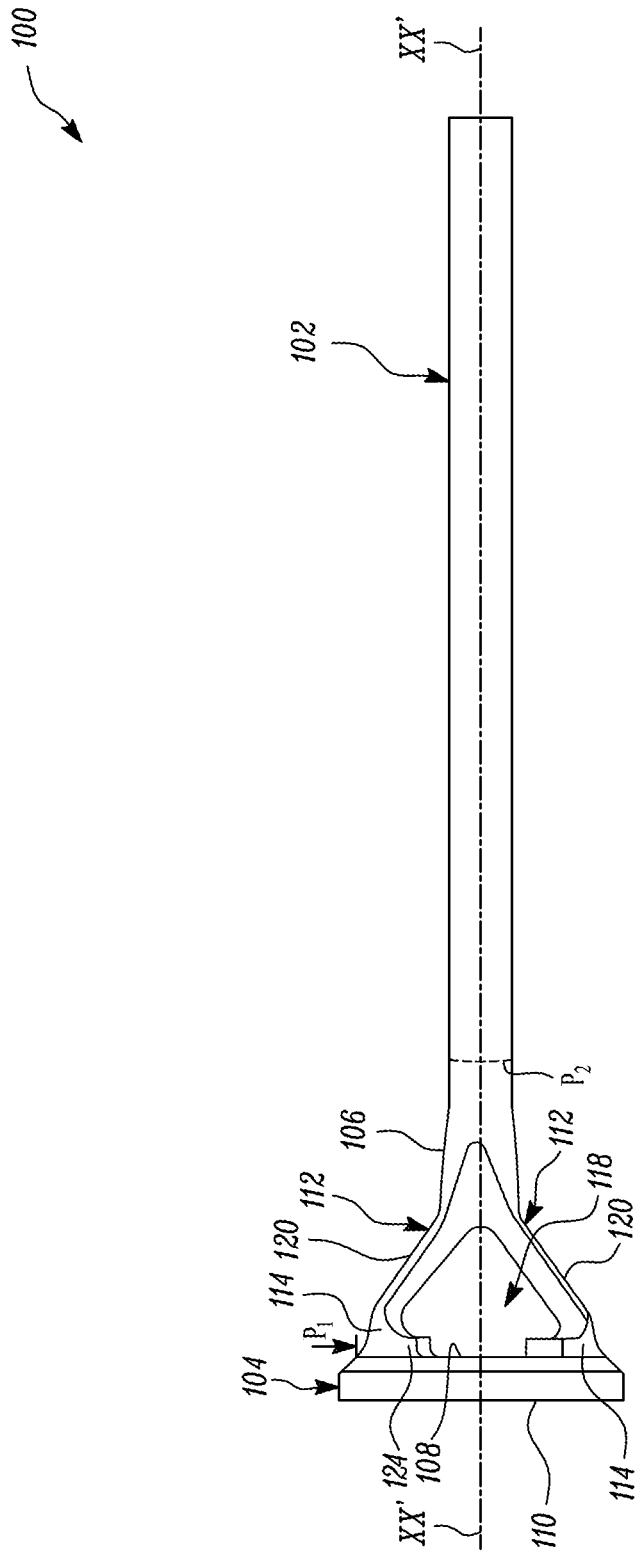
FIG. 2 is a side view of the poppet valve taken along plane AA' of FIG. 1.

As shown, each of the arcuately shaped appendages 112 has a mid-portion 120. Referring to FIG. 2, a side elevation view of the poppet valve 100 taken along plane AA' of FIG. 1 is depicted. Additionally or optionally, as shown in the illustrated embodiment of FIG. 2, the mid-portion 120 of each arcuately shaped appendage 112 may be concavely bent so as to be disposed proximal to the longitudinal axis XX'.

Figure 3:
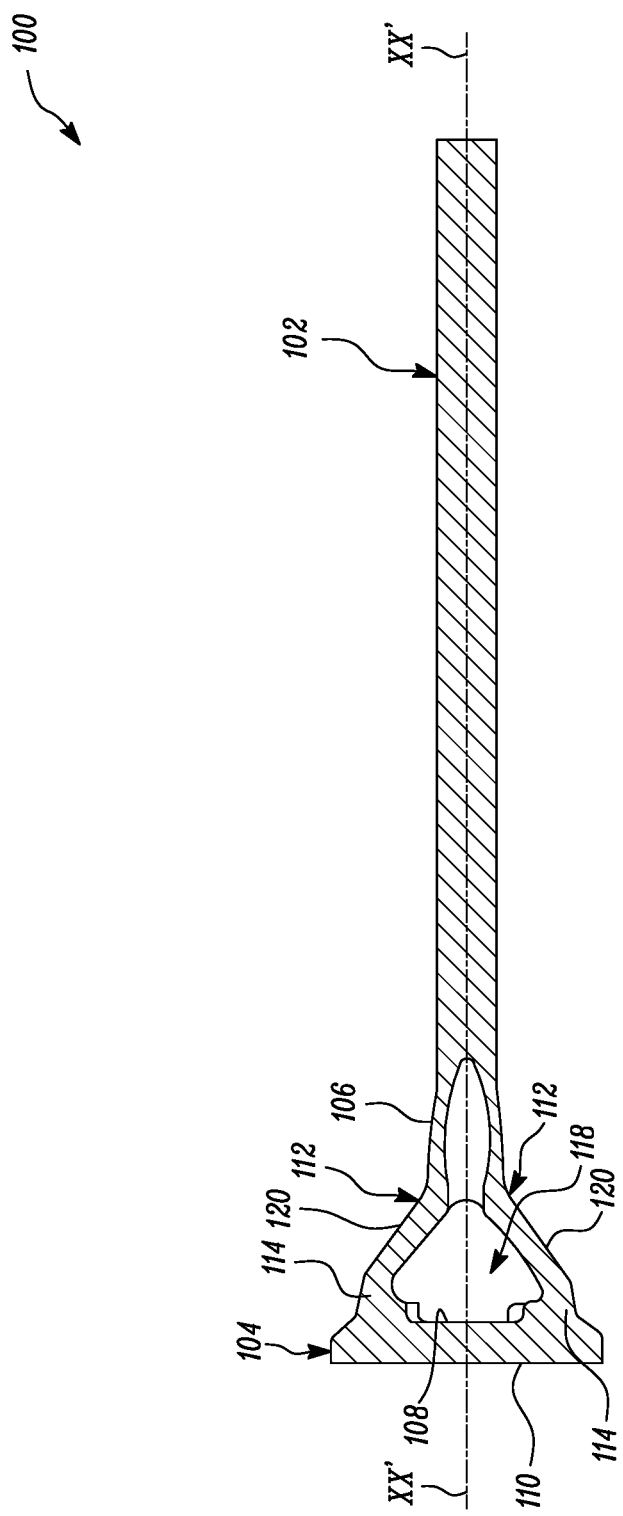
FIG. 3 is a sectional view of the poppet valve taken along plane BB' of FIG. 1 showing a solid construction of the poppet valve, in accordance with an embodiment of the present disclosure.
Figure 4:
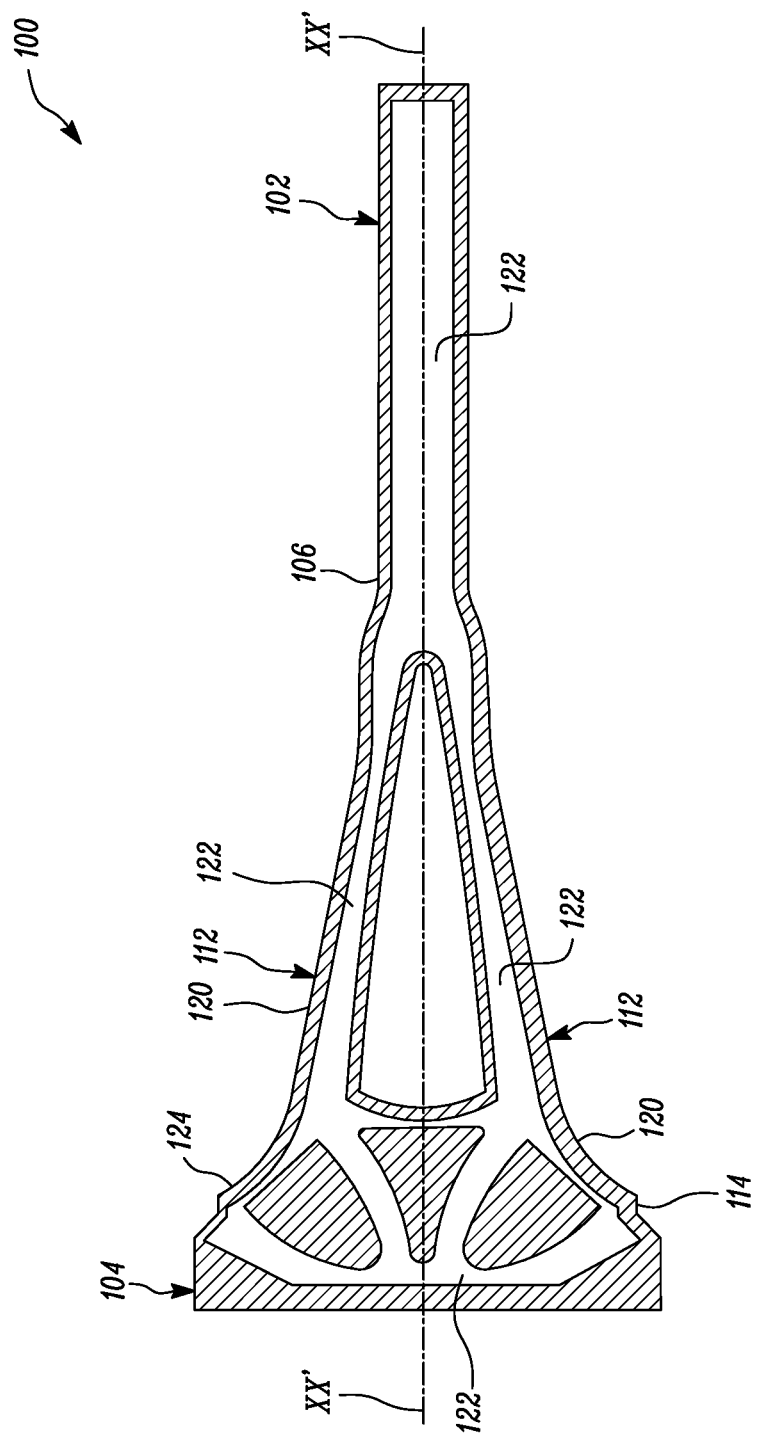
FIG. 4 is a sectional view of the poppet valve in accordance with another embodiment of the present disclosure, the sectional view of FIG. 4 showing a passageway in the volume of the poppet valve.

FIG. 3 depicts a side sectional view of the poppet valve 100 taken along section BB' of FIG. 1. As shown in the illustrated embodiment of FIG. 3, a volume of the poppet valve 100 is solid throughout. However, in an alternative embodiment as shown in FIG. 4, the poppet valve 100 may define a passageway 122 disposed within a volume of each appendage 112. Further, as shown in FIG. 4, the passageway 122 from each appendage 112 may be configured to extend within a volume of the elongated stem 102 and a volume of the valve body 104 as well. In this embodiment, the poppet valve 100 may also include a coolant that is disposed within the passageway 122.

The coolant disposed within the passageway 122 may include, for example, liquid sodium (Na). It may be noted that a type and state of the coolant disclosed herein is merely exemplary in nature. In other embodiments, other states of the coolant including, but not limited to, solid, semi-solid, liquid, and/or gas may be implemented for use in the passageway 122 of the poppet valve 100. Further, other types of coolants known to persons skilled in the art including, but not limited to, a mixture of sodium (Na) and mercury (Hg) may be implemented in lieu of the sodium based coolant disclosed herein. In a further example, the sodium (Na), used as a coolant, may be replaced by potassium (K), suitable eutectic alloys, salts, mercury (Hg) or other compositions having suitable thermal characteristics for use as a cooling medium.

Figure 5:
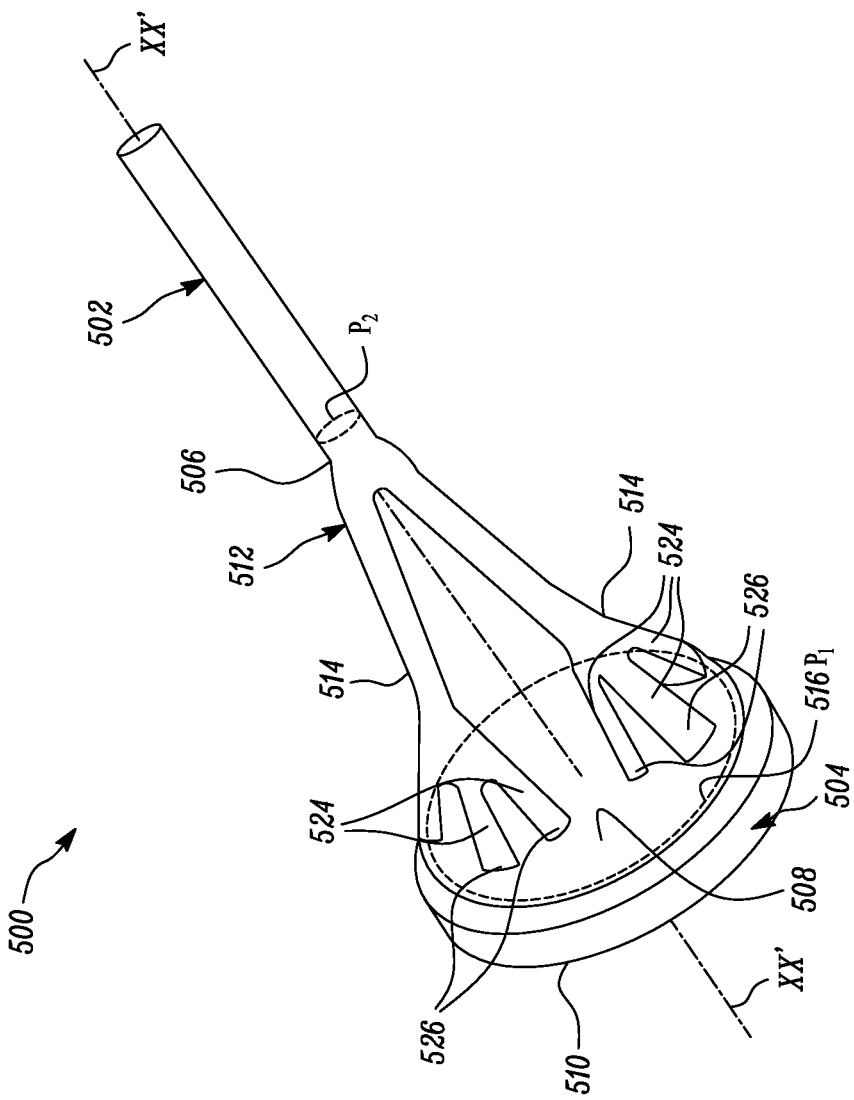
FIG. 5 is a perspective view of a poppet valve, in accordance with yet another embodiment of the present disclosure.

FIG. 5 shows a poppet valve 500 in accordance with another embodiment of the present disclosure. Since the embodiment of the poppet valve 500 is generally reminiscent of the embodiment of the poppet valve 100 taken from FIG. 1, components that are similar between the poppet valve 100 and the poppet valve 500 will be annotated by similar numbers increased by 400.

With reference to FIG. 5, the poppet valve 500 has an elongated stem 502 that is configured to extend along a longitudinal axis XX'. The poppet valve 500 also includes a valve body 504 that is disposed laterally with respect to the longitudinal axis XX' and located in a spaced apart relation with an end 506 of the elongated stem 502.

The valve body 504 has a pair of opposing faces 508, 510 disposed co-axial with the longitudinal axis XX' of the elongated stem 502. The poppet valve 500 further includes at least two arcuately shaped primary appendages 512 depending downwardly from the end 506 of the elongated stem 502 and extending away from the longitudinal axis XX' of the elongated stem 502. An end 514 of each primary appendage 512 is configured to branch off into a plurality of secondary appendages 524 such that an end 526 of each secondary appendage 524 is disposed in abutment with an annular region 516 defined on the top face 508 of the valve body 504. Moreover, a perimeter $P_1$ of the annular region 516 to which the end 526 of each secondary appendage 524 abuts is larger than a perimeter $P_2$ of the elongated stem 502 measured about the longitudinal axis XX'. The poppet valve 500 also includes a void 518 defined between each of the primary appendages 512, each of the secondary appendages 524 and the valve body 504. The void 518 disclosed herein is configured to include the longitudinal axis XX' therein.

Figure 6:
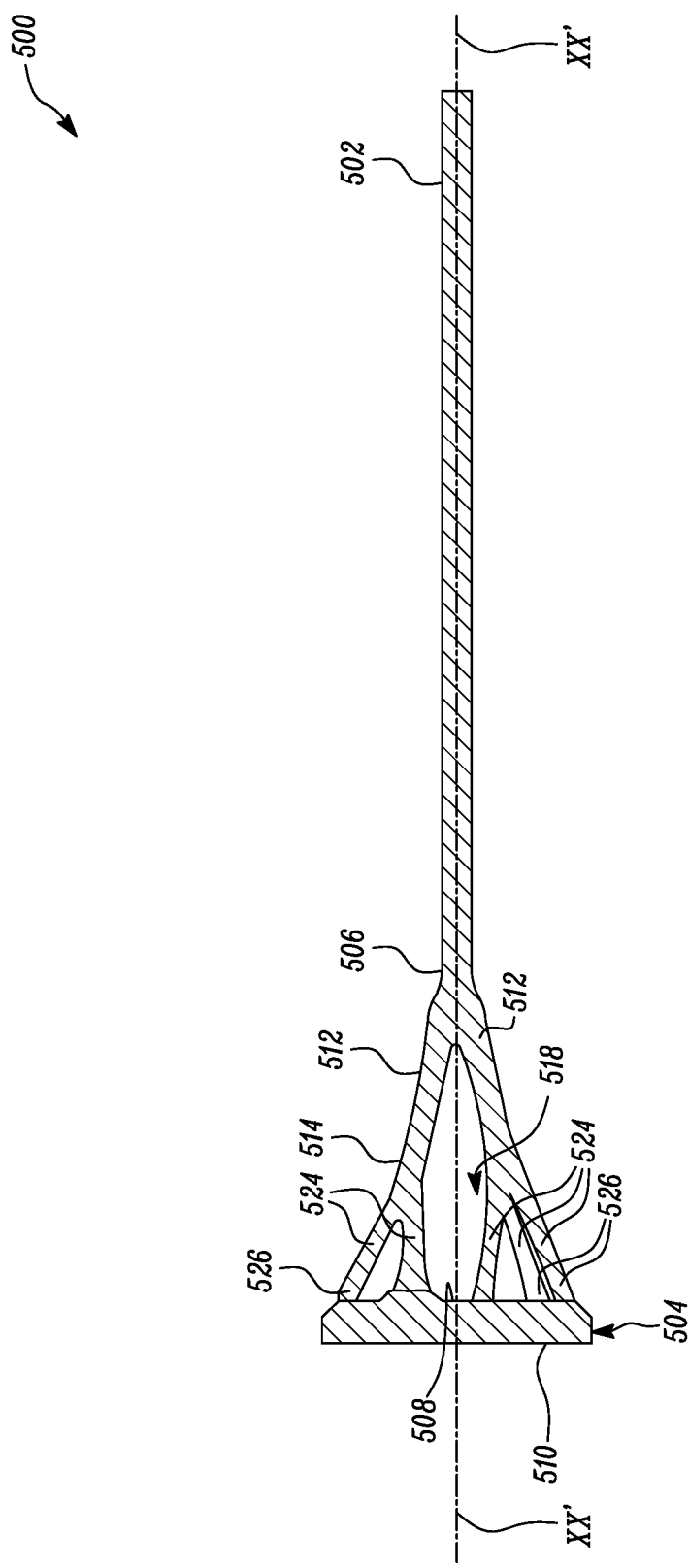
FIG. 6 is a side sectional view of the poppet valve showing a solid construction of the poppet valve.
Figure 7:
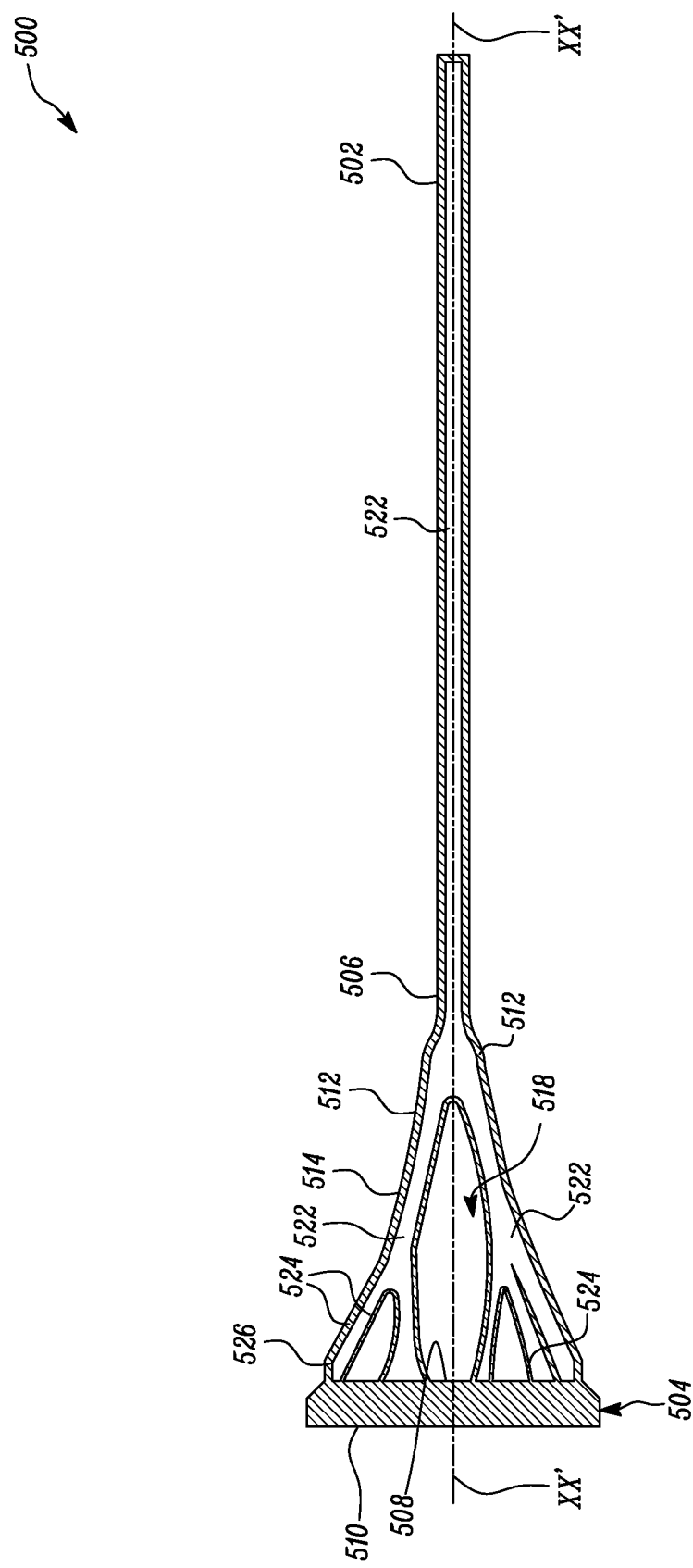
FIG. 7 is a side sectional view of the poppet valve showing a passageway in the volume of the poppet valve, in accordance with an additional embodiment of the present disclosure.

Referring to FIG. 6, a side sectional view of the poppet valve 500 taken along plane BB' of FIG. 5 is depicted. As shown in the illustrated embodiment of FIG. 6, a volume of the poppet valve 500 is solid throughout. Additionally or optionally, as shown in the illustrated embodiment of FIG. 6, each of the primary and secondary appendages 512, 524 is concavely bent so as to be disposed proximal to the longitudinal axis XX'. However, in an alternative embodiment as shown in FIG. 7, the poppet valve 500 may define a passageway 522 disposed within a volume of each primary appendage 512. Further, as shown in the illustrated embodiment of FIG. 7, the passageway 522 from each primary appendage 512 may be configured to extend within a volume of the elongated stem 502, the volume of the secondary appendage 524, and a volume of the valve body 504 as well. In this embodiment, the poppet valve 500 could further include a coolant that may be disposed within the passageway 522.

Figure 8:
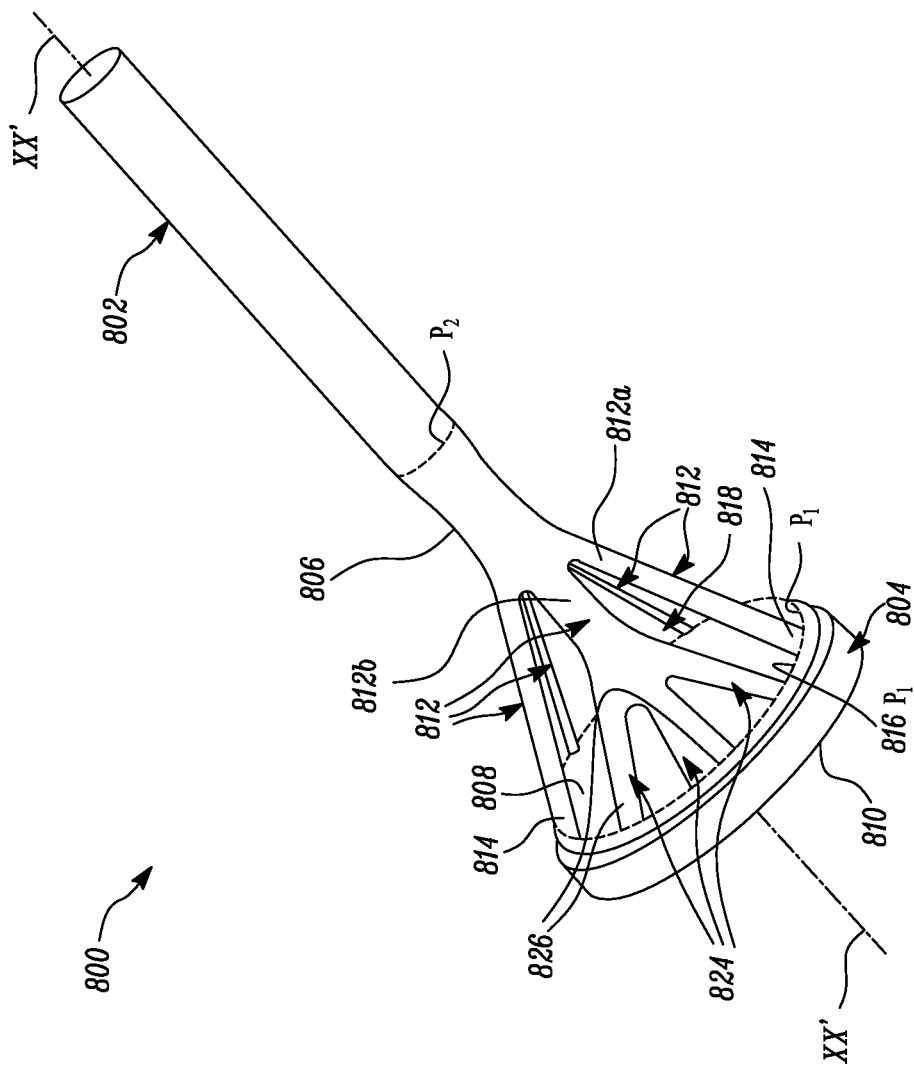
FIG. 8 is a perspective view of a poppet valve, in accordance with yet another embodiment of the present disclosure.

FIG. 8 shows a poppet valve 800 in accordance with another embodiment of the present disclosure. Since the embodiment of the poppet valve 800 is generally reminiscent of the embodiment of the poppet valve 500 taken from FIG. 5, components that are similar between the poppet valve 800 and the poppet valve 500 will be annotated by similar numbers increased by 300.

With reference to FIG. 8, the poppet valve 800 has an elongated stem 802 that is configured to extend along a longitudinal axis XX'. The poppet valve 800 also includes a valve body 804 that is disposed laterally with respect to the longitudinal axis XX' and located in a spaced apart relation with an end 806 of the elongated stem 802.

The valve body 804 has a pair of opposing faces i.e., a top face 808, and a seating surface 810 each of which are disposed co-axial with the longitudinal axis XX' of the elongated stem 802. The poppet valve 800 further includes at least two arcuately shaped primary appendages 812 depending downwardly from the end 806 of the elongated stem 802 and extending away from the longitudinal axis XX' of the elongated stem 802. An end 814 of at least one primary appendage 812, for example, the primary appendage '812a' shown in FIG. 8 is disposed in abutment with an annular region 816 defined on the top face 808 of the valve body 804.

The end 814 of at least another one of the primary appendages 812 for e.g., the primary appendage '812b' shown in FIG. 8, is configured to branch off into a plurality of secondary appendages 824. Further, an end 826 of each secondary appendage 824 is disposed in abutment with the annular region 816 defined on the top face 808 of the valve body 804. In this embodiment, while some of the primary appendages 812 extend to abut directly with the annular region 816 of the top face 808, a remainder of the primary appendages 812 may be configured to branch-off into the plurality of secondary appendages 824. Accordingly, it may be noted that regardless of whether the ends 814 of the primary appendages 812 directly abut with the annular region 816 or branch-off into the plurality of secondary appendages 824, the end 814 of each primary appendage 812 and the end 826 of each secondary appendage 824 is configured to abut with the annular region 816 disposed on the top face 808 of the valve body 804.

Moreover, a perimeter $P_1$ of the annular region 816 to which the ends 814, 826 of respective ones of the primary and secondary appendages 812, 824 abut with is larger than a perimeter $P_2$ of the elongated stem 802 measured about the longitudinal axis XX'. Further, as shown in FIG. 8, the poppet valve 800 also includes a void 818 defined between each of the primary appendages 812, each of the secondary appendages 824 and the valve body 804. The void 818 disclosed herein is configured to include the longitudinal axis XX' therein.

Figure 9:
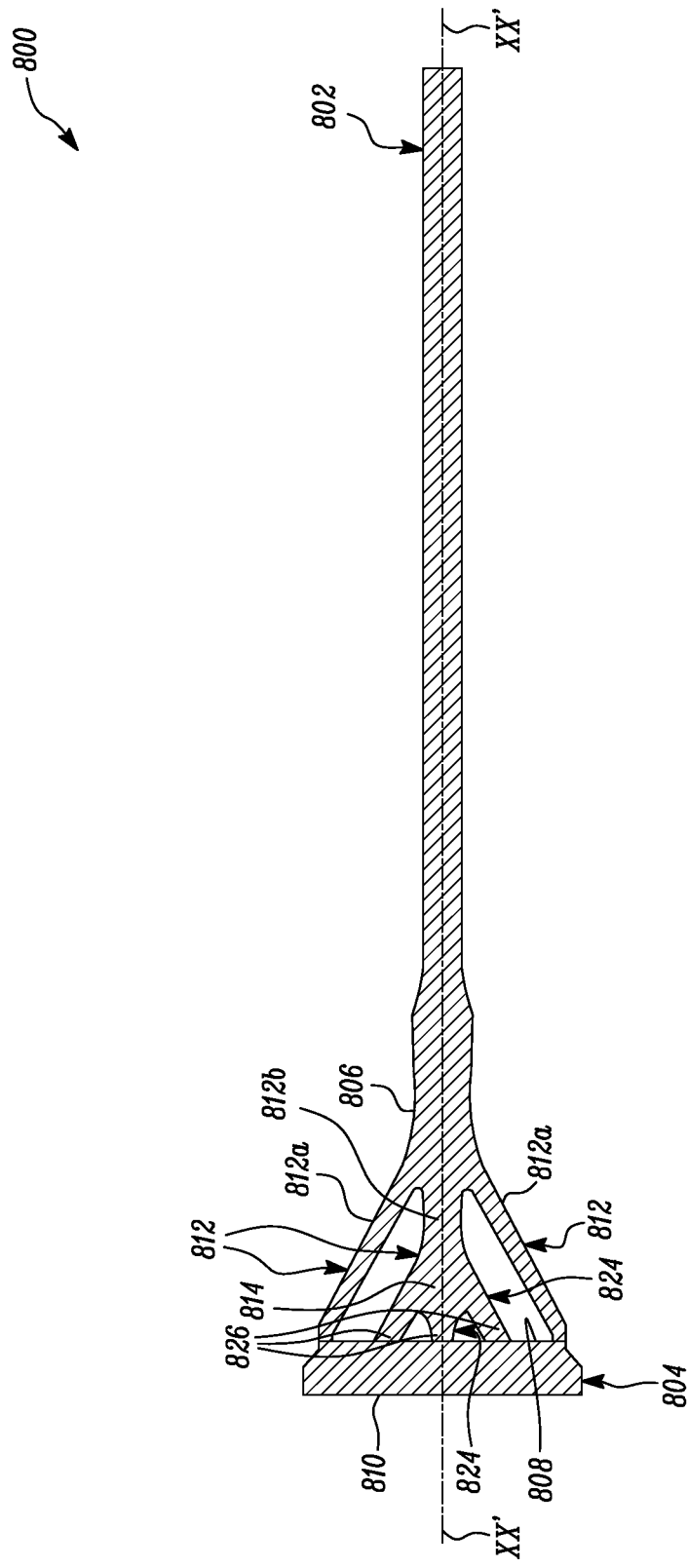
FIG. 9 is a sectional view of the poppet valve showing a solid construction of the poppet valve.

Referring to FIG. 9, a side sectional view of the poppet valve 800 taken along plane BB' of FIG. 8 is depicted. As shown in the illustrated embodiment of FIG. 9, a volume of the poppet valve 800 is solid throughout. Additionally or optionally, as shown in the illustrated embodiment of FIG. 9, each of the primary and secondary appendages 812, 824 is concavely bent so as to be disposed proximal to the longitudinal axis XX'.

Figure 10:
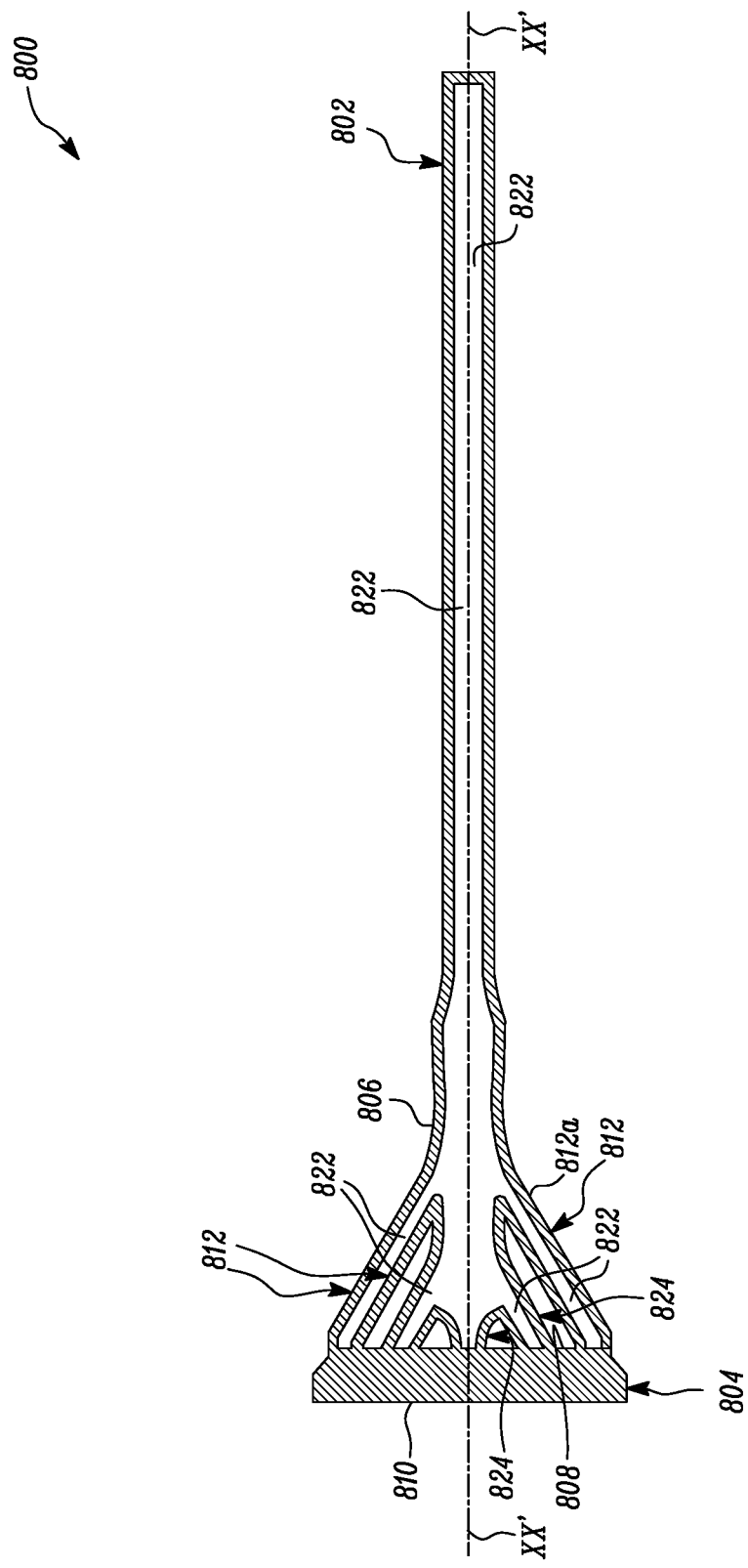
FIG. 10 is a side sectional view of the poppet valve showing a passageway in the volume of the poppet valve, in accordance with an additional embodiment of the present disclosure.

In an alternative embodiment as shown in FIG. 10, the poppet valve 800 may define a passageway 822 disposed within a volume of each primary appendage 812. Further, as shown in the illustrated embodiment of FIG. 10, the passageway 822 from each primary appendage 812 may be configured to extend within a volume of the elongated stem 802, a volume of the secondary appendage 824, and a volume of the valve body 804 as well. In this embodiment, the poppet valve 800 could also be provided with a coolant that is disposed within the passageway 822.

Various embodiments disclosed herein are to be taken in the illustrative and explanatory sense, and should in no way be construed as limiting of the present disclosure. All directional references (e.g., top, bottom, above, below) are only used for identification purposes to aid the reader's understanding of the present disclosure, and may not create limitations, particularly as to the position, orientation, or use of the devices and/or methods disclosed herein. Moreover, all joinder references (e.g., attached, affixed, joined, abut, associated, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "primary", "secondary", "first", "second", "third" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional components, such features may be omitted from the scope of the present disclosure without departing from the spirit of the present disclosure as defined in the appended claims.

INDUSTRIAL APPLICABILITY

Embodiments of the present disclosure have applicability for use and implementation in increasing an overall performance and power density of internal combustion engines. Moreover, embodiments of the present disclosure also have applicability in reducing a mass of poppet valves thereby optimizing an amount of effort required in accomplishing valve lift.

Further, as embodiments disclosed herein are configured to impart a branched structure to the poppet valve by way of the primary appendages and/or the secondary appendages, the void between the appendages and the valve body allows for an increased amount of air or air-fuel charge to be delivered into the combustion chamber when the poppet valve of the present disclosure is implemented as an intake valve for use in an internal combustion engine. Likewise, when implemented as an exhaust valve, the void in the poppet valve of the present disclosure allows for a larger volume of the products of combustion to exit the combustion chamber.

Furthermore, an amount of valve lift required by an intake valve or an exhaust valve, if implemented with use of the poppet valve disclosed herein, could also be reduced in comparison to that required by a traditional poppet valve. This is possible with the incorporation of the void in the design of the poppet valve disclosed herein. Moreover, as the amount of effort required for accomplishing a pre-defined amount of valve lift with use of the poppet valve disclosed herein is less than that required for traditional poppet valves, valve lift arrangements may benefit from requiring only a fraction of the actuation force typically required with use of traditional poppet valves.

Still further, with implementation of a cylindrical elongated stem, it has been contemplated that the poppet valve, when disposed within the valve guide portion of the cylinder head, can rotate about its longitudinal axis XX' during operation of the engine. This means that wear that typically occurs on the seating face of the valve body, at least in part, due to the firing of fuel-air charge in the combustion chamber, can be beneficially distributed over an area corresponding to the seating surface of the valve body as the poppet valve is allowed to rotate about its longitudinal axis XX' during operation of the engine. Moreover, this helps to optimize a wear pattern on the seating face of the valve body and therefore, prolong a service life of the poppet valve disclosed herein. Accordingly, persons skilled in the art will appreciate that a service life of the poppet valve disclosed herein is advantageously larger in duration as compared to that of a traditional poppet valve design in which previously known designs of poppet valves entail a rotationally locked position about their respective longitudinal axes during operation of the engine.

In embodiments of this disclosure, it may also be noted that the primary and/or secondary appendages present in the poppet valve of the present disclosure are arranged, preferably, in an axisymmetric configuration about the longitudinal axis XX' of the poppet valve. This way, it is envisioned that a mass or weight distribution of the poppet valve would be generally uniform about the longitudinal axis XX' so as to facilitate a hermetic seal of the valve body vis-à-vis the cylinder head of the engine when the valve lift arrangement associated with the poppet valve is in operation, particularly, when the valve lift arrangement is in its dwell state. Moreover, it is further envisioned that with a concave configuration of the primary and/or secondary appendages with the longitudinal axis XX', the poppet valve of the present disclosure is rendered with a maximum amount of structural integrity against forces that are typically encountered during operation.

While aspects of the present disclosure have been particularly shown and described with reference to the embodiments above, it will be understood by those skilled in the art that various additional embodiments may be contemplated by the modification of the disclosed embodiments without departing from the spirit and scope of what is disclosed. Such embodiments should be understood to fall within the scope of the present disclosure as determined based upon the claims and any equivalents thereof.

What is claimed is:

1. A poppet valve comprising:
   an elongated stem extending along a longitudinal axis;
   a valve body disposed laterally with respect to the longitudinal axis and located in a spaced apart relation with an end of the elongated stem, the valve body having a pair of opposing faces disposed co-axial with the longitudinal axis of the elongated stem, a bottom face of the opposing faces of the valve body being entirely solid and free of any openings;
   at least two arcuately shaped appendages depending downwardly from the end of the elongated stem and extending away from the longitudinal axis of the elongated stem; and
   a void defined between the at least two arcuately shaped appendages and the valve body, the void being configured to include the longitudinal axis therein,
   wherein the at least two arcuately shaped appendages and the void form an inverted Y in a side elevational view of the poppet valve,
   wherein an end of each said at least two arcuately shaped appendage is disposed in abutment with an annular region defined on a top face of the opposing faces of the valve body,
   wherein each of the at least two arcuately shaped appendages has an inner step portion that extends substantially perpendicular from the abutment of the valve body, and an outer portion that extends from the abutment of the valve body at an angle less than that of the inner step portion, and wherein a perimeter of the annular region is larger than a perimeter of the elongated stem measured about the longitudinal axis.

2. The poppet valve of claim 1, wherein the at least two arcuately shaped appendages form a cavity, an opening of the cavity leading directly to the void between the at least two arcuately shaped appendages.

3. The poppet valve of claim 1, wherein a volume of the poppet valve is solid throughout.

4. The poppet valve of claim 1, wherein each of the at least two arcuately shaped appendages has a mid-portion, the mid-portion being concavely bent so as to be disposed proximal to the longitudinal axis.

5. The poppet valve of claim 1, wherein a perimeter of the bottom face extends entirely outside the abutment of the ends of the at least two arcuately shaped appendages with the annular region in an end view of the poppet valve.

6. The poppet valve of claim 1, wherein each of the at least two arcuately shaped appendages includes more than two arcuately shaped appendages.

7. The poppet valve of claim 1 further comprising a passageway disposed within a volume of each of the at least two arcuately shaped appendages.

8. The poppet valve of claim 7, wherein the passageway is configured to extend within a volume of the elongated stem and a volume of the valve body.

9. The poppet valve of claim 7 further comprising a coolant disposed in the passageway.

10. A poppet valve comprising:
an elongated stem extending along a longitudinal axis;
a valve body disposed laterally with respect to the longitudinal axis and located in a spaced apart relation with an end of the elongated stem, the valve body having a pair of opposing faces disposed co-axial with the longitudinal axis of the elongated stem, a bottom face of the opposing faces of the valve body being entirely solid and free of any openings;
at least two arcuately shaped primary appendages depending downwardly from the end of the elongated stem and extending away from the longitudinal axis of the elongated stem; and
a void defined between the at least two arcuately shaped appendages, the plurality of secondary appendages, and the valve body, the void being configured to include the longitudinal axis therein,
wherein an end of each said at least two arcuately shaped primary appendage branches off into a plurality of secondary appendages,
wherein an end of each secondary appendage is disposed in abutment with an annular region defined on a top face of the opposing faces of the valve body,
wherein each of the at least two arcuately shaped primary appendages extends substantially perpendicular to the valve body, and each of the plurality of secondary appendages extends from the top face of the opposing faces of the valve body to the end of at least one of the primary appendages, and
wherein a perimeter of the annular region is larger than a perimeter of the elongated stem measured about the longitudinal axis.

11. The poppet valve of claim 10, wherein the at least two arcuately shaped appendages form a cavity, an opening of the cavity leading directly to the void between the at least two arcuately shaped appendages.

12. The poppet valve of claim 10, wherein a volume of the poppet valve is solid throughout.

13. The poppet valve of claim 10, wherein each of the at least two arcuately shaped primary appendages and each of the plurality of secondary appendages is concavely bent so as to be disposed proximal to the longitudinal axis.

14. The poppet valve of claim 10, wherein a shape of the elongated stem is cylindrical.

15. The poppet valve of claim 10 further comprising a passageway disposed within a volume of each of the at least two arcuately shaped primary appendages.

16. The poppet valve of claim 15, wherein the passageway is configured to extend within a volume of the elongated stem, a volume of each secondary passageway and a volume of the valve body.

17. The poppet valve of claim 15 further comprising a coolant disposed in the passageway.

18. A poppet valve comprising:
an elongated stem extending along a longitudinal axis;
a valve body disposed laterally with respect to the longitudinal axis and located in a spaced apart relation with an end of the elongated stem, the valve body having a pair of opposing faces disposed co-axial with the longitudinal axis of the elongated stem, a bottom face of the opposing faces of the valve body being entirely solid and free of any openings;
at least two arcuately shaped primary appendages depending downwardly from the end of the elongated stem and extending away from the longitudinal axis of the elongated stem; and
a void defined between the at least two arcuately shaped appendages, the plurality of secondary appendages, and the valve body, the void being configured to include the longitudinal axis therein,
wherein an end of at least one said arcuately shaped primary appendage is disposed in abutment with an annular region defined on a top face of the opposing faces of the valve body,
wherein an end of at least another one of the arcuately shaped primary appendages branches off into a plurality of secondary appendages, and wherein an end of each said secondary appendage is disposed in abutment with an annular region defined on one of the opposing faces of the valve body,
wherein each of the at least two arcuately shaped primary appendages extends substantially perpendicular to the valve body, and each of the plurality of secondary appendages extends from the top face of the opposing faces of the valve body to the end of at least one of said at least another one of the primary appendages, and
wherein a perimeter of the annular region is larger than a perimeter of the elongated stem measured about the longitudinal axis.

19. The poppet valve of claim 18, wherein the at least two arcuately shaped appendages form a cavity, an opening of the cavity leading directly to the void between the at least two arcuately shaped appendages.

20. The poppet valve of claim 18, wherein each of the at least two arcuately shaped primary appendages and each of the plurality of secondary appendages is concavely bent so as to be disposed proximal to the longitudinal axis.

* * * * *